(12) United States Patent
Murray et al.

(10) Patent No.: US 6,814,996 B2
(45) Date of Patent: Nov. 9, 2004

(54) NUTRITIONALLY SUPERIOR CHEESE PRODUCTS

(75) Inventors: Shannon Noreen Murray, Chicago, IL (US); Sheryl Lynn Cole, Glenview, IL (US); Dalip Kumar Nayyar, Grayslake, IL (US); Qadri Mustafa Abdallah, Lake Villa, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 263 days.

(21) Appl. No.: 10/025,107

(22) Filed: Dec. 19, 2001

(65) Prior Publication Data

US 2003/0129281 A1 Jul. 10, 2003

(51) Int. Cl.$^7$ .................................................. A23C 19/00
(52) U.S. Cl. ....................... 426/582; 426/580; 426/516; 426/518
(58) Field of Search .......................... 426/72, 580, 582, 426/516, 518, 522

(56) References Cited

U.S. PATENT DOCUMENTS

| | | | |
|---|---|---|---|
| 4,299,855 A | 11/1981 | Wada et al. | |
| 5,194,283 A | * 3/1993 | Dupas et al. | ................ 426/582 |
| 5,639,485 A | 6/1997 | Weinstein et al. | |
| 6,143,339 A | 11/2000 | Weinstein et al. | |
| 6,235,321 B1 | 5/2001 | Kerrigan et al. | |
| 6,440,473 B2 * | 8/2002 | Geromini et al. | ............. 426/89 |

OTHER PUBLICATIONS

U.S. patent application Ser. No. 09/638,335 filed Aug. 14, 200—Nayyar et al.
U.S. patent application Ser. No. 09/992,912 filed Nov. 26, 2001—Kinigakis et al.

* cited by examiner

Primary Examiner—Leslie Wong
(74) Attorney, Agent, or Firm—Fitch, Even, Tabin & Flannery

(57) ABSTRACT

The present invention is directed to nutritionally superior cheese products and their methods of manufacture. More particularly, this invention is directed to the manufacture of nutritionally superior cheese products having at least two phases wherein at least one phase is cheese (e.g., process cheese, uncured natural cheese, cured natural cheese, and the like) and at least one phase is a second edible phase (e.g., a cheese different from the first phase, vegetables, meats, mixtures of vegetables and meats, fruit, nuts, and the like). The nutritionally superior cheese products of the present invention are prepared by co-extruding the two or more phases such that the use of adhesives or heat to bind the at least two phases is not required. Nutritional supplements (e.g., vitamins, calcium, minerals, and the like) can be incorporated into one or more of the at least two phases.

27 Claims, 2 Drawing Sheets

A

B

C

D

E

F

NUTRITIONALLY SUPERIOR CHEESE PRODUCTS

FIELD OF THE INVENTION

The present invention is directed to nutritionally superior cheese products and their methods of manufacture. More particularly, this invention is directed to the manufacture of nutritionally superior cheese products having at least two phases wherein at least one phase is a cheese phase (e.g, process cheese, uncured natural cheese, cured natural cheese, and the like) and at least one phase is a second edible phase (e.g., a cheese different from the first phase, vegetables, meats, fruit, nuts, and the like as well as mixtures thereof). The nutritionally superior cheese products of the present invention are prepared by co-extruding the two or more phases such that the use of adhesives or heat is not required to bind the at least two phases. Moreover, the nutritionally superior cheese products of the present invention do not require moisture barriers separating the cheese phase and the second edible phase. Nutritional supplements (e.g., vitamins, calcium, minerals, and the like) can be incorporated into one or more of the at least two phases.

BACKGROUND OF THE INVENTION

Cheese-containing products and other dairy products are generally high in protein and can form an important part of a nutritious diet. Efforts have been made to prepare cheese-containing products and other dairy products in forms which are more convenient to consume and which have even increased nutritional benefits. Efforts have also been made to prepare such cheese-containing products and other dairy products in attractive and/or convenient shapes, sizes, and/or forms, which encourage consumption by individuals and especially by children and health-conscious adults.

Recently, for example, solid milk products have been described in copending U.S. patent application Ser. No. 09/992,912, filed on Nov. 14, 2001. These solid milk products are high solids, low moisture, high-protein, shelf-stable milk products which are solid at ambient temperatures and, therefore, can be conveniently transported and consumed by hand.

U.S. Pat. No. 4,299,855 (Nov. 10, 1981) described a method of producing a snack-sized cheese product comprising the steps of cooling a molten cheese to a temperature of about 35° C., heating a surface area extending in the radial direction from the surface of the cheese to a thickness of ⅛ to ⅙ of the cheese diameter of the cooled cheese to a temperature of about 52 to 39° C., cutting the heated cheese into snack sized pieces by rolling within a mold die for rounding the pieces of cheese, and forming each of the snack sized pieces into a rounded shape without corners, thereby providing a snack sized cheese product formed into a desirable rounded shape such as spherical, ellipsoidal, and barrel shape and having good appearance without creases and cracks on the surface thereof as well as a homogeneous texture.

U.S. Pat. No. 6,235,321 (May 22, 2001) provided a snack food product in the form of resilient, molded, self-sustaining bodies preferably made from a heated mixture comprising a dairy product (cheese, yogurt, or pudding), gelatin, fat, and water. The product bodies are small and bite sized, having a mass to surface area ratio of from about 0.05–5 g/cm$^2$, which facilitates molding thereof. Preferred food products are prepared by first creating a heated flowable mixture of including cheese, gelatin, fat, and water, and depositing small quantities of the mixture into molding depressions formed in powdered starch; after hardening, the resultant products are separated from the starch and packaged.

It would be desirable to provide cheese-containing products which are more convenient to consume and which have increased nutritional benefits. It would also be desirable to provide cheese-containing products in attractive and/or convenient shapes, sizes, and/or forms, which encourage consumption by individuals and especially by children and health-conscious adults. The present invention provides such cheese-containing products.

SUMMARY OF THE INVENTION

The present invention is directed to nutritionally superior cheese products and their methods of manufacture. More particularly, this invention is directed to the manufacture of nutritionally superior cheese products having at least two phases wherein at least one phase is a cheese phase (e.g., process cheese, uncured natural cheese, cured natural cheese, and the like) and at least one phase is a second edible phase (e.g., a cheese different from the first phase, vegetables, meats, fruit, nuts, and the like as well as mixtures thereof). The nutritionally superior cheese products of the present invention are prepared by co-extruding the two or more phases such that the use of adhesives or heat is not required to bind the at least two phases. Moreover, the nutritionally superior cheese products of the present invention do not require moisture barriers separating the cheese phase and the second edible phase. Nutritional supplements (e.g., vitamins, calcium, minerals, and the like) can be incorporated into one or more of the at least two phases. Preferably the second edible phase is selected from the group consisting of vegetables, meats, mixtures of vegetables and meats, fruits, and nuts, and even more preferably from the group consisting of vegetables, meats, mixtures of vegetables and meats, and fruits. The second edible phase, especially when containing vegetables, meats, or mixtures of vegetables and meats, may also contain cheese (either the same as or different from the cheese in the first or cheese phase).

The present invention provides a nutritionally superior cheese product comprising at least a first discrete phase and a second discrete phase, wherein the first discrete phase comprises a cheese phase and the second discrete phase comprises a second edible phase, wherein the cheese product is prepared by co-extruding the cheese phase and the second edible phase without the use of adhesive or heat to bind the cheese phase and the second edible phase together to form the nutritionally superior cheese product.

The present invention also provides a nutritionally superior cheese product comprising at least a first discrete phases and a second discrete phase phases, wherein the first discrete phase consists essentially of a cheese phase and the second discrete phase consists essentially of a second edible phase, wherein the cheese product is prepared by co-extruding the cheese phase and the second edible phase without the use of adhesive or heat to bind the cheese phase and the second edible phase together to form the nutritionally superior cheese product.

The present invention also provides a method for producing a nutritionally superior cheese product having at least a first discrete phase and a second discrete phase, wherein the first discrete phase comprises a cheese phase and the second discrete phase comprises a second edible phase, said method comprising:

(1) providing a cheese phase in the form of cheese chucks or cheese shreds at a temperature of about 45 to about 70° F., wherein the cheese phase has a water activity of about 0.85 to about 0.95 and pH of about 4.5 to about 6;

(2) providing a second edible phase having a water activity of about 0.85 to about 0.95 and pH of about 4.5 to about 6;

(3) co-extruding the cheese phase and second edible phase under low to moderate shear conditions without the use of adhesive or heat to bind the cheese phase and the second edible phase together as discrete phases to form a nutritionally superior cheese extruded product; and (4) cutting the nutritionally superior cheese extruded product to the desired length to form the nutritionally superior cheese product.

The present invention also provides a method for producing a nutritionally superior cheese product having at least a first discrete phase and a second discrete phase, wherein the first discrete phase consists essentially of a cheese phase and the second discrete phase consists essentially of a second edible phase, said method comprising:

(1) providing a cheese phase in the form of cheese chucks or cheese shreds at a temperature of about 45 to about 70° F., wherein the cheese phase has a water activity of about 0.85 to about 0.95 and pH of about 4.5 to about 6;

(2) providing a second edible phase having a water activity of about 0.85 to about 0.95 and pH of about 4.5 to about 6;

(3) co-extruding the cheese phase and second edible phase under low to moderate shear conditions without the use of adhesive or heat to bind the cheese phase and the second edible phase together as discrete phases to form a nutritionally superior cheese extruded product; and (4) cutting the nutritionally superior cheese extruded product to the desired length to form the nutritionally superior cheese product.

DETAILS OF THE INVENTION

Figure 1:
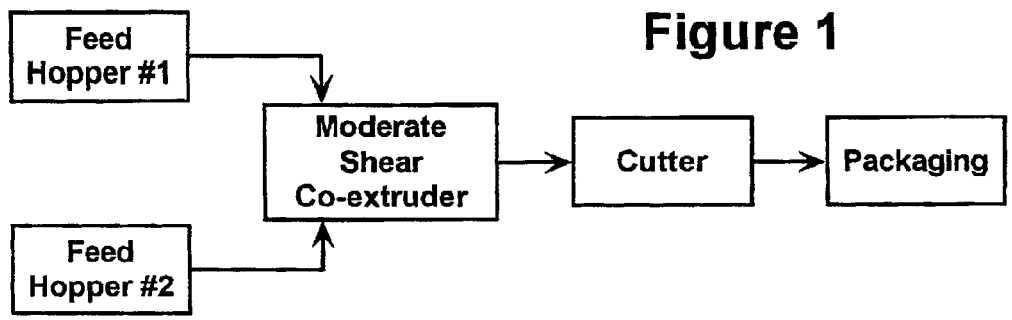
FIG. 1 is a schematic diagram of the process of the invention.

The present invention is directed to nutritionally superior cheese products and their methods of manufacture. More particularly, this invention is directed to the manufacture of nutritionally superior cheese products having at least two phases wherein at least one phase is a cheese phase (e.g., process cheese, uncured natural cheese, cured natural cheese, and the like) and at least one phase is a second edible phase (e.g., a cheese different from the first phase, vegetables, meat, mixtures of vegetables and meat, fruit, nuts, and the like). The nutritionally superior cheese products of the present invention are prepared by co-extruding the two or more phases such that the use of adhesives or heat is not required to bind the at least two phases. Moreover, the nutritionally superior cheese products of the present invention do not require moisture barriers separating the cheese phase and the second edible phase. Nutritional supplements (e.g., vitamins, calcium, minerals, and the like) can be incorporated into one or more of the at least two phases. Preferably the second edible phase is selected from the group consisting of vegetables, meats, mixtures of vegetables and meats, fruits, and nuts, and even more preferably from the group consisting of vegetables, meats, mixtures of vegetables and meats, and fruits. The second edible phase, especially when containing vegetables, meats, or mixtures of vegetables and meats, may also contain cheese (either the same as or different from the cheese in the first or cheese phase).

The nutritionally superior cheese products of this invention have, at a minimum, two phases wherein at least one phase is a cheese phase (e.g., process cheese, uncured natural cheese, cured natural cheese, and the like) and at least one phase is a second edible phase (e.g., a cheese different from the first phase, vegetables, meat, mixtures of vegetables and meats, fruit, nuts, and the like). The first phase is a cheese phase; suitable cheeses for use as the first phase include, for example, process cheeses, uncured natural cheeses, and cured natural cheeses such as mozzarella, cheddar (mild, medium, or sharp), cream cheese, Havarti, Colby, Monterey Jack, and the like. The second edible phase is a cheese different from the first phase, vegetables, meats, fruits, nuts, or the like and mixtures thereof. Preferably the second edible phase is vegetables, meats, fruits, mixtures of vegetables and meats, or mixtures of vegetables and cheese. Suitable vegetables include a wide variety of green, yellow, orange, and red vegetables, such as, for example, carrots, various types of peppers, broccoli, various types of peas and pea-pods, cauliflower, onions, tomatoes, mushrooms, zucchini, corn, celery, asparagus, green beans, water chestnuts, bamboo shoots, and the like. Especially preferred vegetables for use in the present invention include premium quality intermediate moisture vegetables as described in U.S. patent application Ser. No. 09/638,335, filed on Aug. 14, 2000 which is hereby incorporated by reference. Suitable meats include, for example, beef, poultry, pork, and seafood. Such meats should be ready-to-eat (i.e., precooked) and may be in the form of chunks/pieces or a paste. Suitable fruits include, for example, blueberries, strawberries, figs, and the like. If desired, either of the phases may contain colorants, flavorants (e.g., spices, herbs, salt), preservatives, antimicrobial agents, functional components (e.g., thickening agents, water activity depressants), and the like.

Generally, the nutritionally superior cheese products of this invention contain about 30 to about 70 percent of the first cheese phase and about 30 to about 70 percent of the second edible phase. More preferably, the nutritionally superior cheese products of this invention contain about 40 to about 60 percent of the first cheese phase and about 40 to about 60 percent of the second edible phase.

The nutritionally superior cheese products of this invention do not require the use of adhesives or heat to bind the at least two phases. Moreover, the nutritionally superior cheese products of the present invention do not require moisture barriers separating the cheese phase and the second edible phase. The discrete phases of the nutritionally superior cheese products of the present invention remain separate and distinct throughout their shelf life without the use of such adhesive, heat, and/or moisture barriers. Although not wishing to be limited by theory, it is though that the discrete phases remain separate and distinct throughout their shelf life because the water activity and pH of the second edible phase are closely matched to the water activity and pH of the cheese phase, the viscosities of the two phases are adjusted to optimal levels for co-extrusion, and the co-extrusion is carried out under low to moderate shear conditions. These important formulation and process parameters are discussed in more detail below. Typically, the nutritionally superior cheese products of the present invention have shelf lives of about 2 to about 6 weeks when stored at ambient conditions and about 2 to about 4 months where stored under refrigeration temperatures.

Figure 2:
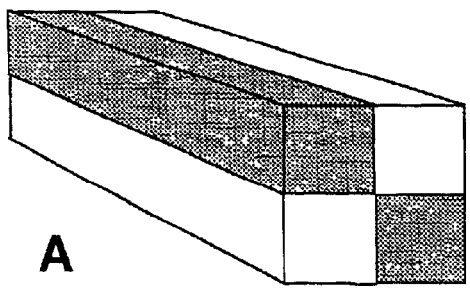
FIG. 2 provides various product designs (panels A through L) for the nutritionally superior cheese products of the invention.
Figure 2:
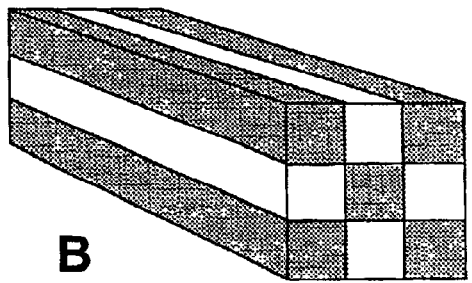
Figure 2:
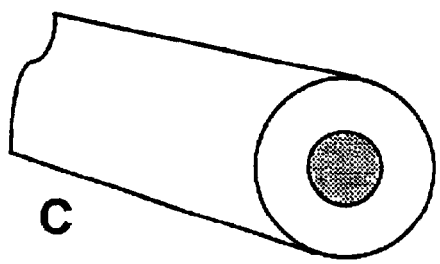
Figure 2:
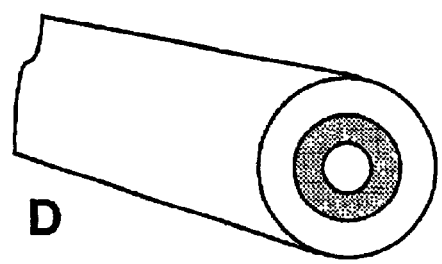
Figure 2:
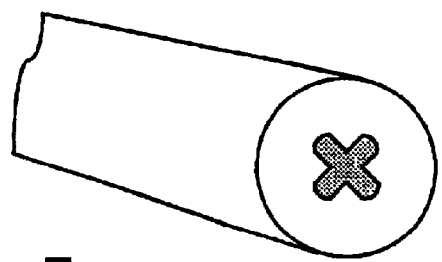
Figure 2:
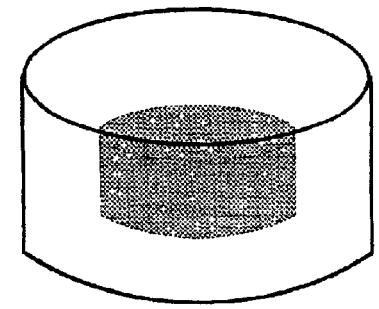
Figure 2:
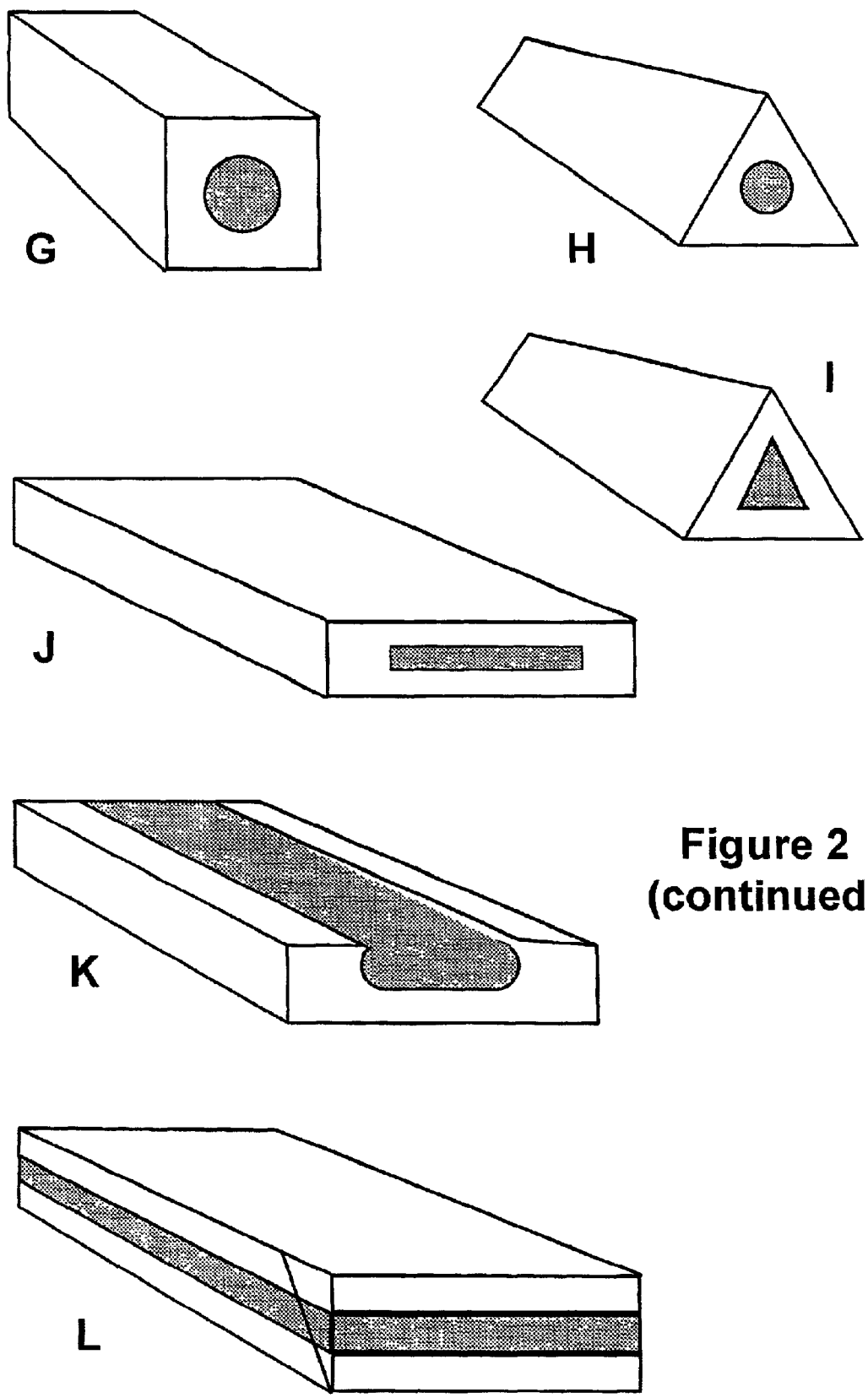

The general process of the present invention is illustrated in FIG. 1. The cheese phase and the second edible phase are fed into hoppers to be delivered to an extruder, preferably a moderate shear extruder. Although only two feed hoppers are shown in FIG. 2, more feed hoppers can be used if desired, to produce products having more than two separate and distinct phases. The extruded product from the extruder is then cut to the appropriate length and packaged. More specifically, the cheese-containing products of this invention are prepared by (1) providing a cheese phase in the form of cheese chucks or cheese shreds at a temperature of about 45 to about 70° F., wherein the cheese phase has a water activity of about 0.85 to about 0.95 and pH of about 4.5 to about 6; (2) providing a second edible phase having a water activity of about 0.85 to about 0.95 and pH of about 4.5 to about 6; (3) co-extruding the cheese phase and second edible phase under low to moderate shear conditions without the use of adhesive or heat to bind the cheese phase and the second edible phase together as discrete phases to form a nutritionally superior cheese extruded product; and (4) cutting the nutritionally superior cheese extruded product to the desired length to form the nutritionally superior cheese product.

Generally, the two (or more) phases are provided to the extruder in separate feed hoppers. Preferably the cheese phase is introduced in the form of cheese chucks or cheese shreds and maintained at a temperature of about 45 to about 70° F., a water activity of about 0.85 to about 0.95, and pH of about 4.5 to about 6 during extrusion. More preferably, the cheese phase during extrusion is at a temperature of about 50 to about 68° F. and has a water activity of about 0.87 to about 0.93 and pH of about 4.8 to about 5.2. Both the water activity and pH of the second edible phase should be closely matched. Thus, generally the water activity and pH of the second edible phase should be in the range of about 0.85 to about 0.95 and about 4.5 to about 6, respectively, and more preferably about 0.87 to about 0.93 and about 4.8 to about 5.2, respectively. Even more preferably, the water activity of the second edible phase should be within about 0.02 units of the water activity of the cheese phase and the pH of the second edible phase should be within about 0.2 units of the pH of the cheese phase. Preferably the second edible phase is pasteurized and then cooled prior to addition to the extruder.

The water activity of the various components can be varied as needed by the addition of water activity depressants. For example, the water activity of the second edible phase can be adjusted to closely match the water activity of the cheese phase by the addition of water activity depressants such as glycerin, salt, honey, calcium lactate, sodium lactate, and the like (generally at levels of less than about 5 percent). Preferably the water activities of the cheese phase and the second edible phase are in the range of about 0.87 to about 0.93 and are within about 0.02 units of each other.

The pH of the various components can be varied as needed by the addition of edible acids and/or bases or by selection of the ingredients in the second edible phase. Generally, the pH of the second edible phase is adjusted, if needed, to closely match the pH of the cheese phase (i.e., preferably within about 0.2 units of the pH of the cheese phase). Edible acids that can be added include, for example, lactic acid, citric acid, malic acid, phosphoric acid, fumaric acid, and the like. Edible bases that can be added include, for example, food grade carbonates, bicarbonates, or phosphates derived from sodium, calcium, or potassium sources, and the like. As noted, the pH can also be varied by selection of the ingredients in the second edible phase. Thus, for example, the pH of the second edible phase could be raised by using low acid fruits or vegetables in the second edible phase.

Generally, the components (cheese and the second edible phase) should have a dough-like viscosity for optimal extrusion. Generally the viscosity of the cheese phase and the second edible phase should be in the range of about 500 to about 500,000 cps. Preferably the viscosity should be in the range of about 50,000 to about 500,000 cps and more preferably about 200,000 to about 500,000 cps. If necessary, the viscosity of the components can be adjusted by varying the process conditions (e.g., temperature of the feed stocks) and/or addition of viscosity modifiers. For example, the viscosity of components could be lower, if needed, by lowering the feed stock temperature or by addition of a plasterizer (e.g., glycerin or a plastic fat). The viscosity of components could be increased, if needed, by raising the feed stock temperature or by addition of a thickening agent (e.g., natural or modified starch, gum, hydrocolloid, and the like). Generally, such viscosity modifiers, if used, are added at levels less than about 5 percent.

The nutritionally superior cheese extruded products of the present invention are prepared using a low to moderate shear extruder. Such an extruder allows for the gentle co-extrusion of the nutritionally superior cheese extruded products without excessive pressure which would tend to overly shear the phases and adversely effect their viscosities during extrusion. For purposes of this invention, a low to moderate shear extruder generally operates at a shear rate or pressure and under conditions whereby the viscosity of the phases are not reduced by less than about 20 percent and preferably less than about 10 percent during extrusion. Suitable extruders for use in this invention include, for examples, those described in U.S. Pat. No. 5,639,485 (Jun. 17, 1977) and U.S. Pat. No. 6,143,339 (Nov. 7, 2000), both of which are incorporated by reference. A particularly preferred extruder for use in this invention is the Cornucopia™ KN400 extruder available from Rheon U.S.A. (Hunterville, N.C.).

Depending on the extruder die, a number of shapes and configurations of the nutritionally superior cheese extruded products of this invention can be produced. For example, the nutritionally superior cheese extruded products can be produced in various forms—for example, solid bars, candy-type bars, cookies, bite-sized forms or pieces, shapes (e.g., animal, stars, letters), and the like. Examples of the nutritionally superior cheese extruded products of this invention are shown in FIG. 2, panels A through L; of course, other shapes, configurations, and sizes can be used as desired. The size of the nutritionally superior cheese extruded products of this invention can be widely varied. Preferably the nutritionally superior cheese extruded products are designed to be hand-held during consumption. Thus, for example, such products will preferably have a diameter of about 0.5 to about 2 inches and a length of about 2 to about 6 inches (e.g., panels A–D and G–I). Bite-sized products (e.g., panel F) can also be prepared. Likewise, bar type shapes (e.g., panels J–K) may also be prepared.

The nutritionally superior cheese extruded products of this invention have at least two separate and distinct phases (i.e., at least one cheese phase and one second edible phase as shown in panels A, C, and E through L of FIG. 2). Products may contain more than two separate and distinct phases as shown in panels B and D. Thus, for example, the product as illustrated in panel D could consist of an outer cheese phase, and middle second edible phase, and an inner cheese phase (using either the same or a different cheese as used in the outer phase); alternatively, the middle phase could be cheese with the outer and inner phases being the same or different second components. For the products illustrated in FIG. 2, the "outer" phase (i.e., the non-shaded phase in panels C through L) is preferably the cheese phase; using the cheese phase as the "outer" portion should allow the product to be more easily handled and consumed by hand. Of course, if desired, the second edible phase could form the "outer" layer.

Preferably, the nutritionally superior cheese extruded products of this invention also contain antimicrobial agents to enhance shelf life. Suitable antimicrobial agents include, for example, natamycin, nisin, potassium sorbate, sodium benzoate, sorbic acid, propionic acid, cultured skim milk, cultured dextrose, and the like. Natamycin, if used, is normally less than about 50 ppm and preferably in the range of about 5 to about 45 ppm. The use of natamycin is described in, for example, U.S. Pat. No. 6,156,362 (6,156,362), U.S. Pat. No. 6,156,362 (Apr. 20, 1999), U.S. patent application Ser. No. 09/275,471, filed Mar. 24, 1999, and U.S. patent application Ser. No. 09/618,514, filed Jul. 18, 2000, all of which are hereby incorporated by reference.

Nisin, if used, is normally less than about 2000 IU and preferably in the range of about 50 to about 1500 IU. An especially preferred form of nisin for use in the present invention is nisin-containing whey derived from a nisin-producing culture or the curds obtained from such a culture as described in U.S. patent application Ser. No. 09/386,795, filed Aug. 31, 1999, U.S. patent application Ser. No. 09/638,335, filed Aug. 14, 2000, and U.S. patent application Ser. No. 09/386,609, filed Aug. 31, 1999, all of which are hereby incorporated by reference.

Other antimicotics such as potassium sorbate, sodium benzoate, sorbic acid, propionic acid, cultured skim milk, and cultured dextrose, if used, are generally at levels less than about 2000 ppm. Potassium sorbate and sodium benzoate, if used, are preferably present in a ratio of about 0.5 to about 1.5 and more preferably a ratio of about 1:1. Cultured skim milk and cultured dextrose are natural anti-microbials which are available from Rhodia Food Inc. (Cranbury N.J.) under the tradename MicroGARD®.

The following examples are provided to illustrate the invention and not to limit it. Unless otherwise indicated, all percentages and ratios are by weight.

EXAMPLE 1

This example illustrates the preparation of a nutritionally superior cheese extruded product having a first cheese phase and a second vegetable/cheese phase (i.e., a spinach ricotta phase). A spinach ricotta mixture was prepared by blending the following ingredients:

| Component | Amount |
| --- | --- |
| Chopped Spinach (instant quick frozen) | 49.6% |
| Whole Milk Ricotta Cheese | 24.8% |
| Grated Parmesan Cheese | 8.3% |
| Italian Seasoned Crumb Mixture | 8.3% |
| Nisin-Containing Whey Concentrate | 1.6% |
| Glycerin | 1.6% |
| Onion Powder | 1.8% |
| Salt | 0.8% |
| Modified Food Starch | 0.08% |
| Garlic Powder | 0.06% |
| Olive Oil | 0.4% |

-continued

| Component | Amount |
| --- | --- |
| Lemon Juice | 0.4% |
| Oregano | 0.3% |
| Basil | 0.3% |
| Black Pepper | 0.25% |
| Potassium Sorbate | 225 ppm |
| Sodium Benzoate | 225 ppm |

The resulting spinach ricotta mixture was cooked at about 180° F. for about 2 to about 3 minutes, cooled immediately to room temperature, and then stored under refrigeration conditions until used. The mixture had a water activity of about 0.93 and a pH of about 5.7. The cheese phase consisted of mozzarella cheese having a water activity of about 0.93 and a pH of about 5.2.

The nutritionally superior cheese extruded product was prepared using a Cornucopia™ KN400 extruder (Rheon U.S.A., Hunterville, N.C.) operating at a speed of about 700 to about 720 pounds/hr (about 90 percent of maximum speed). The cheese phase in the feeder hopper was held at a temperature of about 55° F. The spinach ricotta mixture in the feeder hopper was held at a temperature of about 45° F. A die was used to produce a nutritionally superior cheese extruded product having essentially the shape as illustrated in FIG. 2, panel B. The extruder feed rates were selected to provide a product containing about 60 percent cheese phase and about 40 percent spinach ricotta phase. The resulting product had a shelf life of about 3 months at refrigerated temperatures. The resulting product could be hand held and consumed.

EXAMPLE 2

This example illustrates the preparation of a nutritionally superior cheese extruded product having a first cheese phase and a second tomato-based phase (i.e., a pizza filling phase). A tomato-based mixture was prepared by blending the following ingredients:

| Component | Amount |
| --- | --- |
| Spaghetti Sauce | 36.0% |
| Tomato Paste | 33.0% |
| Italian Seasoned Crumb Mixture | 16.0% |
| Grated Parmesan Cheese | 5.0% |
| Dry Spaghetti Sauce Mix | 3.9% |
| Pesto Sauce | 2.4% |
| Nisin-Containing Whey Concentrate | 2.0% |
| Modified Food Starch | 0.4% |
| Glycerin | 0.4% |
| Lemon Juice | 0.3% |
| Oregano | 0.2% |
| Basil | 0.2% |
| Black Pepper | 0.1% |
| Sodium Benzoate | 600 ppm |

The resulting tomato-based mixture was cooked at about 180° F. for about 2 to about 3 minutes, cooled immediately to room temperature, and then stored under refrigeration conditions until used. The mixture had a water activity of about 0.928 and a pH of about 5.7. The cheese phase consisted of mozzarella cheese having a water activity of about 0.93 and a pH of about 5.2.

The nutritionally superior cheese extruded product was prepared using a Cornucopia™ KN400 extruder (Rheon U.S.A., Hunterville, N.C.) operating at a speed of about 700 to about 720 pounds/hr (about 90 percent of maximum speed). The cheese phase in the feeder hopper was held at a temperature of about 55° F. The tomato-based mixture in the feeder hopper was held at a temperature of about 45° F. A die was used to produce a nutritionally superior cheese extruded product having essentially the shape as illustrated in FIG. 2, panel C. The extruder feed rates were selected to provide a product containing about 60 percent cheese phase and about 40 percent tomato-based phase. The resulting product had a shelf life of about 3 months at refrigerated temperatures. The resulting product could be hand held and consumed.

EXAMPLE 3

This example illustrates the preparation of a nutritionally superior cheese extruded product having a first cheese phase and a second cheddar-broccoli phase. A cheddar-broccoli mixture was prepared by blending about 33 percent broccoli bits and about 67 percent pasteurized processed cheese spread. The broccoli bits were prepared as described in U.S. patent application Ser. No. 09/638,335, filed on Aug. 14, 2000. The resulting cheddar-broccoli mixture was cooked at about 180° F. for about 2 to about 3 minutes, cooled immediately to room temperature, and then stored under refrigeration conditions until used. The mixture had a water activity of about 0.908 and a pH of about 5.7. The cheese phase consisted of a mild cheddar cheese having a water activity of about 0.921 and a pH of about 5.

The nutritionally superior cheese extruded product was prepared using a Cornucopia™ KN400 extruder (Rheon U.S.A., Hunterville, N.C.) operating at a speed of about 700 to about 720 pounds/hr (about 90 percent of maximum speed). The cheese phase in the feeder hopper was held at a temperature of about 55° F. The cheddar-broccoli mixture in the feeder hopper was held at a temperature of about 45° F. A die was used to produce a nutritionally superior cheese extruded product having essentially the shape as illustrated in FIG. 2, panel L. The extruder feed rates were selected to provide a product containing about 60 percent cheese phase and about 40 percent cheddar-broccoli phase. The resulting product had a shelf life of about 3 months at refrigerated temperatures. The resulting product could be hand held and consumed.

EXAMPLE 4

This example illustrates the preparation of a nutritionally superior cheese extruded product having a first cheese phase and a second fruit-based phase. A blueberry-based mixture was prepared by blending the following ingredients:

| Component | Amount |
|---|---|
| High Moisture Blueberries ($A_w$ = 0.8) | 70.0% |
| High Maltose Corn Syrup | 20.0% |
| Powdered Sugar | 8.4% |
| Nisin-Containing Whey Concentrate | 1.6% |

The resulting fruit-based mixture was cooked at about 180° F. for about 2 to about 3 minutes, cooled immediately to room temperature, and then stored under refrigeration conditions until used. The mixture had a water activity of about 0.88 and a pH of about 4.9. The cheese phase consisted of Havarti cheese having a water activity of about 0.90 and a pH of about 5.4.

The nutritionally superior cheese extruded product was prepared using a Cornucopia™ KN400 extruder (Rheon U.S.A., Hunterville, N.C.) operating at a speed of about 700 to about 720 pounds/hr (about 90 percent of maximum speed). The cheese phase in the feeder hopper was held at a temperature of about 55° F. The fruit-based mixture in the feeder hopper was held at a temperature of about 45° F. A die was used to produce a nutritionally superior cheese extruded product having essentially the shape as illustrated in FIG. 2, panel I. The extruder feed rates were selected to provide a product containing about 60 percent cheese phase and about 40 percent fruit-based phase. The resulting product had a shelf life of about 3 months at refrigerated temperatures. The resulting product could be hand held and consumed.

What is claimed is:

1. A method for producing a nutritionally superior cheese product having at least a first discrete phase and a second discrete phase, wherein the first discrete phase comprises a cheese phase and the second discrete phase comprises a second edible phase, said method comprising:

(1) providing a cheese phase in the form of cheese chucks or cheese shreds at a temperature of about 45 to about 70° F., wherein the cheese phase has a water activity of about 0.85 to about 0.95 and pH of about 4.5 to about 6, and wherein the cheese chucks or cheese shreds are formed from process cheese, uncured natural cheese, or cured natural cheese;

(2) providing a second edible phase having a water activity of about 0.85 to about 0.95 and pH of about 4.5 to about 6;

(3) co-extruding the cheese phase and second edible phase under low to moderate shear conditions without the use of adhesive or heat to bind the cheese phase and the second edible phase together as discrete phases to form a nutritionally superior cheese extruded product; and (4) cutting the nutritionally superior cheese extruded product to the desired length to form the nutritionally superior cheese product.

2. The method as defined in claim 1, wherein the first discrete phase consists essentially of the cheese phase and the second discrete phase consists essentially of the second edible phase.

3. The method as defined in claim 2, wherein the water activity of the second edible phase is within about 0.02 units of the water activity of the cheese phase and the pH of the second edible phase is within about 0.2 units of the pH of the cheese phase.

4. The method as defined in claim 2, wherein at least one of the first and second discrete phases contains a nutritional supplement.

5. The method as defined in claim 3, wherein at least one of the first and second discrete phases contains a nutritional supplement.

6. The method as defined in claim 2, wherein second edible phase is selected from the group consisting of vegetables, meats, mixtures of vegetables and meats, fruits, and nuts.

7. The method as defined in claim 3, wherein second edible phase is selected from the group consisting of vegetables, meats, mixtures of vegetables and meats, fruits, and nuts.

8. The method as defined in claim 5, wherein second edible phase is selected from the group consisting of vegetables, meats, mixtures of vegetables and meats, fruits, and nuts.

9. The method as defined in claim 2, wherein the second edible phase is pasteurized and then cooled prior to co-extrusion.

10. The method as defined in claim 3, wherein the second edible phase is pasteurized and then cooled prior to co-extrusion.

11. The method as defined in claim 5, wherein the second edible phase is pasteurized and then cooled prior to co-extrusion.

12. The method as defined in claim 6, wherein the second edible phase is pasteurized and then cooled prior to co-extrusion.

13. The method as defined in claim 7, wherein the second edible phase is pasteurized and then cooled prior to co-extrusion.

14. The method as defined in claim 8, wherein the second edible phase is pasteurized and then cooled prior to co-extrusion.

15. The method as defined in claim 1, wherein the cheese phase comprises a cured natural cheese.

16. The method as defined in claim 1, wherein the cheese phase comprises a cured natural cheese selected from the group consisting of cured mozzarella cheese, cured cheddar cheese, cured cream cheese, cured Havarti cheese, cured Colby cheese, and cured Monterey Jack cheese.

17. The method as defined in claim 1, wherein the co-extruding the cheese phase and second edible phase under at a shear rate or pressure and under conditions whereby the viscosity of the cheese phase and the second edible phase are not reduced by less than about 10 percent.

18. The method as defined in claim 1, wherein the cheese phase has a viscosity of about 50,000 to about 500,000 cps, and the second edible phase has a viscosity of about 50,000 to about 500,000 cps.

19. The method as defined in claim 1, wherein the cheese phase has a viscosity of about 200,000 to about 500,000 cps, and the second edible phase has a viscosity of about 200,000 to about 500,000 cps.

20. The method as defined in claim 1, wherein the co-extruding further comprises selecting extruder feed rates effective to provide a nutritionally superior cheese product containing about 30 to about 70 percent cheese phase and about 70 to about 30 percent second edible phase.

21. A method for producing a nutritionally superior cheese product having at least a first discrete phase and a second discrete phase, wherein the first discrete phase comprises a cheese phase and the second discrete phase comprises a second edible phase, said method comprising:

(1) providing a cheese phase in the form of cheese chucks or cheese shreds at a temperature of about 50 to about 68° F., wherein the cheese phase has a water activity of about 0.87 to about 0.93, a pH of about 4.8 to about 5.2, and a viscosity of about 50,000 to about 500,000 cps;

(2) providing a second edible phase having a water activity of about 0.87 to about 0.93, a pH of about 4.8 to about 5.2, and a viscosity of about 50,000 to about 500,000 cps, wherein the water activity of the second edible phase is within about 0.02 units of the water activity of the cheese phase and the pH of the second edible phase is within about 0.2 units of the pH of the cheese phase;

(3) co-extruding the cheese phase and second edible phase under at a shear rate or pressure and under conditions whereby the viscosity of the cheese phase and the second edible phase are not reduced by less than about 20 percent, and without the use of adhesive or heat to bind the cheese phase and the second edible phase together as discrete phases to form a nutritionally superior cheese extruded product; and (4) cutting the nutritionally superior cheese extruded product to the desired length to form the nutritionally superior cheese product.

22. The method as defined in claim 21, wherein the co-extruding the cheese phase and second edible phase under at a shear rate or pressure and under conditions whereby the viscosity of the cheese phase and the second edible phase are not reduced by less than about 10 percent.

23. The method as defined in claim 21, wherein the cheese phase has a viscosity of about 200,000 to about 500,000 cps, and the second edible phase has a viscosity of about 200,000 to about 500,000 cps.

24. The method as defined in claim 21, wherein the cheese phase comprises a cured natural cheese.

25. The method as defined in claim 21, wherein the cheese phase comprises a cured natural cheese selected from the group consisting of cured mozzarella cheese, cured cheddar cheese, cured cream cheese, cured Havarti cheese, cured Colby cheese, and cured Monterey Jack cheese.

26. The method as defined in claim 21, the co-extruding further comprises selecting extruder feed rates effective to provide a nutritionally superior cheese product containing about 30 to about 70 percent cheese phase and about 70 to about 30 percent second edible phase.

27. The method as defined in claim 21, wherein the cheese chucks or cheese shreds are formed from process cheese, uncured natural cheese, or cured natural cheese.

* * * * *

UNITED STATES PATENT AND TRADEMARK OFFICE
CERTIFICATE OF CORRECTION

PATENT NO. : 6,814,996 B2
DATED : November 9, 2004
INVENTOR(S) : Murray et al.

It is certified that error appears in the above-identified patent and that said Letters Patent is hereby corrected as shown below:

Title page,
Item [56], References Cited, OTHER PUBLICATIONS, delete "200", and insert -- 2000 --, therefor.

Column 12,
Line 38, after "claim 21," insert -- wherein --.

Signed and Sealed this

Nineteenth Day of April, 2005

JON W. DUDAS
*Director of the United States Patent and Trademark Office*